United States Patent
Ansley

(10) Patent No.: US 9,832,035 B2
(45) Date of Patent: Nov. 28, 2017

(54) POWER SAVING MODE FOR NETWORK DEVICES

(71) Applicant: ARRIS Enterprises, Inc., Suwanee, GA (US)

(72) Inventor: Carol Ansley, Johns Creek, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 453 days.

(21) Appl. No.: 14/084,596

(22) Filed: Nov. 19, 2013

(65) Prior Publication Data

US 2014/0143575 A1    May 22, 2014

Related U.S. Application Data

(60) Provisional application No. 61/727,947, filed on Nov. 19, 2012.

(51) Int. Cl.
| | |
|---|---|
| *G06F 1/32* | (2006.01) |
| *H04L 12/26* | (2006.01) |
| *H04L 12/28* | (2006.01) |
| *H04L 12/12* | (2006.01) |
| *H04N 21/436* | (2011.01) |
| *H04N 21/443* | (2011.01) |
| *H04W 52/02* | (2009.01) |

(52) U.S. Cl.
CPC ............. *H04L 12/282* (2013.01); *G06F 1/32* (2013.01); *H04L 12/12* (2013.01); *H04N 21/43615* (2013.01); *H04N 21/4436* (2013.01); *H04W 52/0235* (2013.01); *Y02B 60/50* (2013.01)

(58) Field of Classification Search
CPC ... G06F 1/3234; H04L 43/10; H04N 21/4436; H04W 52/0235; Y02B 60/32; Y02B 60/34

See application file for complete search history.

(56) References Cited

U.S. PATENT DOCUMENTS

| | | | | |
|---|---|---|---|---|
| 6,012,112 | A * | 1/2000 | Brase | G11B 19/022 348/E5.101 |
| 6,556,576 | B1 * | 4/2003 | Du | H04L 12/4625 370/285 |
| 7,971,080 | B2 * | 6/2011 | Yee | G06F 1/266 713/300 |
| 8,879,455 | B1 * | 11/2014 | Stephenson | H04H 20/423 370/311 |
| 2004/0053643 | A1 * | 3/2004 | Kimura | H04L 12/2801 455/558 |
| 2009/0164690 | A1 * | 6/2009 | Slaight | G06F 13/385 710/306 |
| 2010/0011231 | A1 * | 1/2010 | Banerjea | H04W 52/0251 713/320 |
| 2010/0031297 | A1 * | 2/2010 | Klein | H04L 12/12 725/78 |
| 2010/0061272 | A1 * | 3/2010 | Veillette | H04L 45/34 370/254 |

(Continued)

*Primary Examiner* — Nitin Patel
*Assistant Examiner* — Kevin Stewart
(74) *Attorney, Agent, or Firm* — Stewart M. Wiener

(57) ABSTRACT

Methods, systems, and apparatuses can be operable to facilitate transitioning an node to and from a power-saving mode. A mixed network comprising devices having different protocols and/or specifications can communicate with each other and outdated or legacy devices can utilize power-saving modes possessed by updated devices.

20 Claims, 8 Drawing Sheets

(56) References Cited

U.S. PATENT DOCUMENTS

| | | | |
|---|---|---|---|
| 2011/0013633 A1* | 1/2011 | Klein | H04L 12/185 370/390 |
| 2013/0159567 A1* | 6/2013 | Gallagher | G06F 13/20 710/52 |
| 2013/0185571 A1* | 7/2013 | Gallagher | G06F 1/3234 713/320 |
| 2013/0259034 A1* | 10/2013 | Klein | H04W 52/288 370/389 |

* cited by examiner

POWER SAVING MODE FOR NETWORK DEVICES

CROSS REFERENCE TO RELATED APPLICATION

This application is a non-provisional application claiming the benefit of U.S. Provisional Application Ser. No. 61/727,947, entitled "Power Saving Mode for MoCA 1.1 Clients," which was filed on Nov. 19, 2012, and is incorporated herein by reference in its entirety.

TECHNICAL FIELD

This disclosure relates to power-saving modes for network devices.

BACKGROUND

As network technology and specification continue to advance, it becomes a common occurrence that legacy devices and updated devices are mixed within the same network. Because of updates in technology and specifications, legacy devices can be precluded from communicating with or accessing the same functionality as updated devices.

As an example, the Multimedia over Coax Alliance (MoCA) enables whole-home delivery of multimedia over coaxial cables to multiple MoCA devices, or nodes. A MoCA network can include various MoCA devices, or nodes, and the various MoCA devices can be associated with different MoCA specifications (e.g., version one, version two, etc.).

The MoCA 2.0 specification includes power-saving features. For example, the MoCA 2.0 specification provides that MoCA 2.0 devices are capable of entering four (4) different power-saving modes that correspond to increasing levels of power reduction: M0, M1, M2 and M3. Generally, the MoCA 2.0 specification assumes that MoCA 1.x nodes (e.g., MoCA version 1 nodes) do not support states M1, M2 or M3.

The different power-saving modes defined in MoCA 2.0 generally have the following characteristics. While in power state M0, a MoCA node's transmitter is active upon receiving input data from a subscriber, the MoCA node's receiver is fully active, and the MoCA node possesses full visibility to other devices connected to an associated MoCA network. While in power state M1, a MoCA node's transmitter does not output data received from a subscriber, but station maintenance remains active, the MoCA node's receiver is fully active, and the MoCA node possesses full visibility to other devices connected to an associated MoCA network. While in power state M2, a MoCA node's transmitter outputs a periodic heartbeat and can request data transmission slots, the MoCA node's receiver wakes to listen to specific messages, and the MoCA node's visibility to other devices connected to an associated MoCA network is limited. While in power state M3, a MoCA node's transmitter only outputs periodic heartbeats, the MoCA node's receiver wakes to listen to specific messages, and the MoCA node has no visibility to other devices connected to an associated MoCA network.

The MoCA standard allows MoCA 2.0 nodes in a network having a mixture of MoCA 1.x nodes and MoCA 2.0 nodes to exist in states M0 and M3. However, because MoCA 2.0 nodes in states M1 or M2 have communication limitations and generally must coordinate with a network controller (NC) to pass traffic, those states are not supported in a network with a mixture of MoCA 1.0 and MoCA 2.0 nodes. In the case of MoCA, for example, the MoCA 2.0 specification precludes MoCA 1.0 nodes from taking advantage of the power saving mode M3.

BRIEF DESCRIPTION OF THE DRAWINGS

Like reference numbers and designations in the various drawings indicate like elements.

DETAILED DESCRIPTION

In embodiments, devices, systems and methods can operate to implement power-saving modes in network devices. As an example, devices in a mixed network (e.g., a network containing devices having different protocols or specifications), can communicate with one another, and can access functionalities possessed by devices having different protocols or functionalities from themselves. For example, wake on MoCA (WoM) functionality can be added to MoCA 1.1 nodes with minimal changes to the MoCA 2.0 specification. In embodiments, devices, systems and methods can operate to implement power-saving modes possessed by an updated device (e.g., a device operating with an updated, or more up to date, protocol and/or specification than a protocol and/or specification used by a legacy device) in a legacy device (e.g., a device operating with a protocol and/or specification that is outdated, or older, than a protocol and/or specification used by an updated device). For example, an updated device can be a device operating with MoCA 2.0, or a later MoCA specification, and a legacy device can be a version one MoCA device. It should be understood that an updated device can be any device operating a protocol and/or specification that is updated or new relative to another device, and a legacy device can be any device operating a protocol and/or specification that is out of date or old relative to another device.

Figure 1:
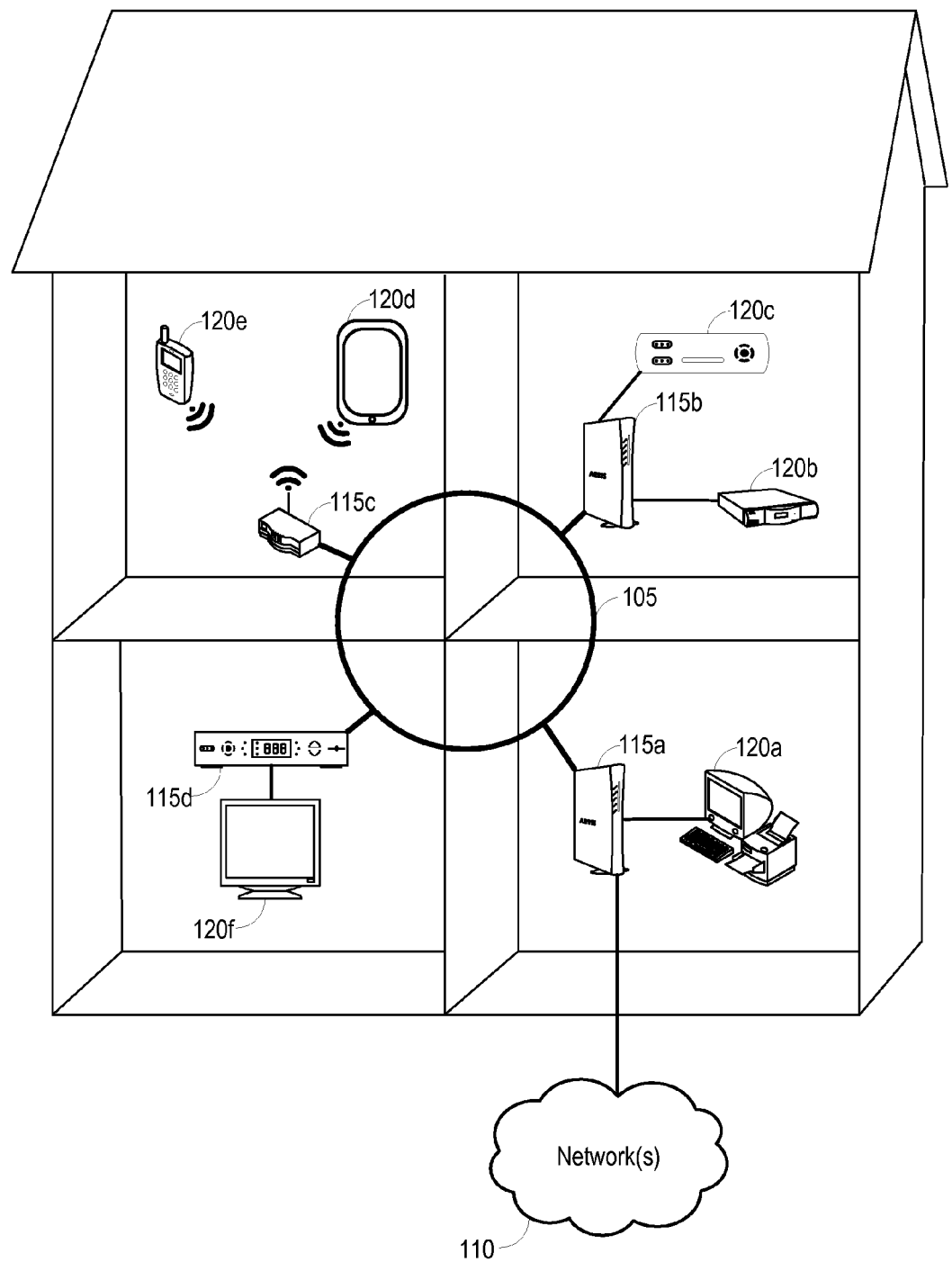
FIG. 1 is a block diagram illustrating an example whole-home network operable to facilitate a node's transition to and from a power-saving mode.

FIG. 1 is a block diagram illustrating an example whole-home network 105 operable to facilitate a node's transition to and from a power-saving mode. In embodiments, the whole-home network 105 can be used to transport communications to and from one or more networks 110 to nodes 115a-d, as well as communications between the nodes 115a-d. In embodiments, the whole-home network 105 can comprise a MoCA network. The communications to and from the one or more networks 110 and nodes 115a-d, as well as the communications between the nodes 115a-d may include various types of signals (e.g., video, data, etc.). In embodiments, the network(s) 110 can be any network capable of delivering video, data, or any other content that is requested or delivered by a subscriber.

In embodiments, the nodes 115a-d may include a modem 115a, a MoCA adapter 115b, a wireless node 115c, and/or a set-top box 115d, or any other devices operable to communicate on a MoCA network. The nodes 115a-d can facilitate communications between the network(s) 110 and one or more client devices 120a-f. A modem 115a can facilitate communications between the network(s) 110 and a computer 120a. A MoCA adapter 115b can facilitate communications between the network(s) 110 and a media gateway 120b, a video game console 120c, and/or other types of multimedia devices. A wireless node 115c can facilitate communications between the network(s) 110 and a tablet 120d, a mobile device 120e, and/or other types of wireless devices. A set top box 115d can facilitate communications between the network(s) 110 and a television or a digital video recorder.

In embodiments, the nodes 115 that are connected to the whole-home network 105 can be version one MoCA nodes (e.g., MoCA 1.0 nodes, MoCA 1.1 nodes, or other version one MoCA nodes), version two MoCA nodes (e.g., MoCA 2.0 nodes, or other version two MoCA nodes), or a mixture of MoCA node types. While a modem 115a is shown as the input/output device to the network(s) 110, any one or more of the nodes 115a-d can be an input/output device to the network(s) 110.

Figure 2:
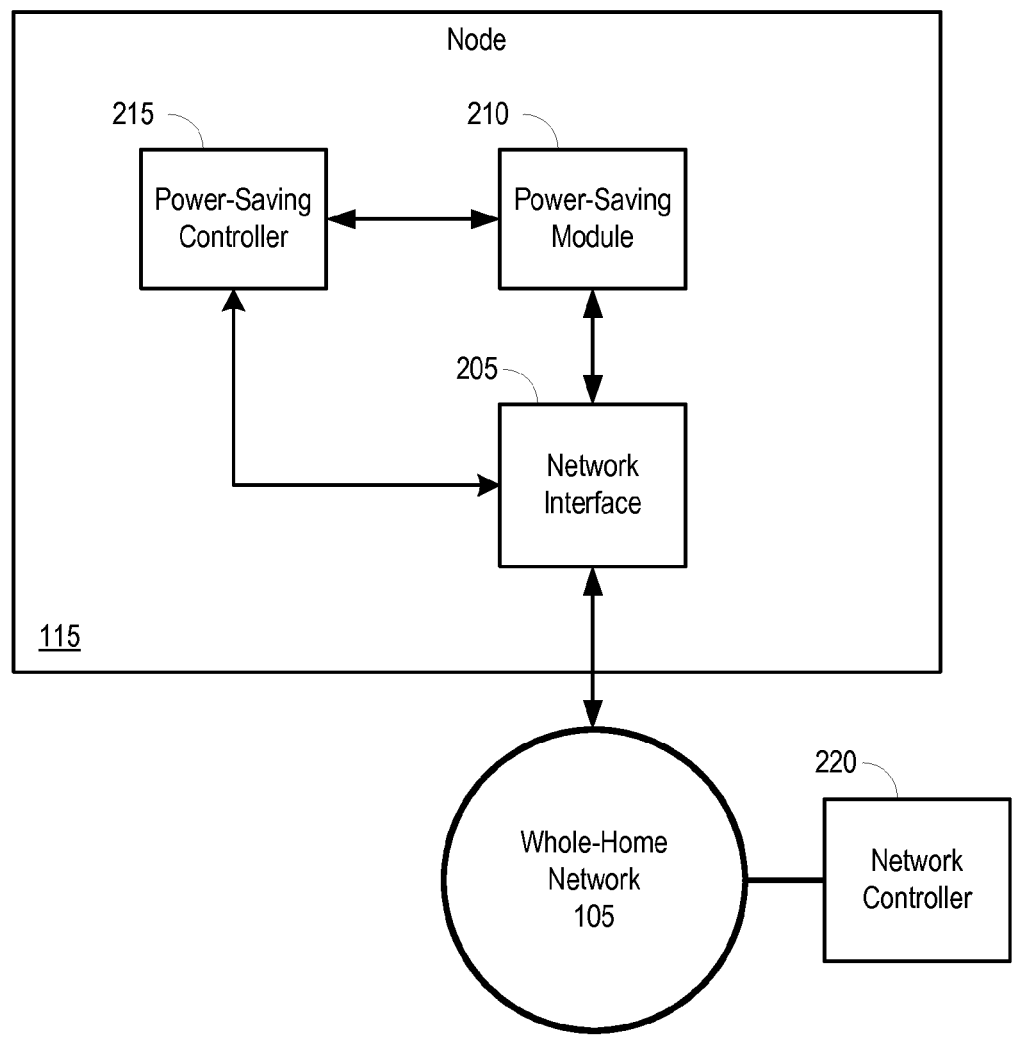
FIG. 2 is a block diagram illustrating an example node operable to facilitate a transition to and from a power-saving mode.

FIG. 2 is a block diagram illustrating an example node 115 operable to facilitate transitions to and from a power-saving mode. In embodiments, the node 115 can be a version one MoCA node or a version two MoCA node. In embodiments, a node 115 can include a network interface 205, a power-saving module 210, and a power-saving controller 215. The network interface 205 can be used to receive data from and output data to a whole-home network 105.

In embodiments, a network controller 220 can be a node that is connected to the whole-home network 105. For example, the network controller 220 can be a MoCA node that is connected to a MoCA network. A node that is connected to the whole-home network 105 can be selected as the network controller 220 based upon the node's broadcast capability. In embodiments, a node can request to be designated as a network controller 220. In embodiments, a node can be designated as a network controller 220 based upon the type of node and/or the amount of time the node has been connected to an associated whole-home network 105. For example, the node that has been connected to the associated whole-home network 105 for the longest amount of time can be designated as the network controller for the whole-home network 105. As another example, certain types of nodes can be preferred for designation as a network controller 220 over other types of nodes (e.g., a modem 115a can be preferred for designation as a network controller 220 over a set-top box 115d). It should be understood that the network controller 220 can be a version two MoCA node or a version one MoCA node. Where the network controller 220 is a version two MoCA node, the network controller can use the MoCA 2.0 specification power states model. Where the network controller 220 is a version one MoCA node, the MoCA 2.0 specifications are typically not implemented.

In embodiments, a power-saving module 210 can place a node 115 into and take the node 115 out of a power-saving mode. For example, upon the direction of a power-saving controller 215 or the detection of a transition signal (e.g., a signal directing the node 115 to enter or leave a power-saving mode) received via the interface 205, the power-saving module 210 can place the node 115 into or take the node 115 out of a power-saving state (e.g., MoCA M1, M2 or M3 states) accordingly.

In embodiments, a power-saving controller 215 can detect a condition signaling the transition of the node 115 to or from a power-saving mode. For example, a power-saving controller 215 can detect a local condition (e.g., a condition occurring at the node 115 such as the pressing of a power, resume, or sleep button on the node, the node remaining idle for a predetermined period of time, an internal configuration of the node, etc.) or a remote condition (e.g., a condition occurring outside of the node 115 such as a signal received from and generated by a network controller 220) that signals the node 115 to enter or exit a power-saving mode.

In embodiments, a power-saving controller 215 can direct the power-saving module to enter into a power-saving mode. For example, the power-saving controller 215 can indicate to the power-saving module to send a message requesting entry into a power-saving mode to the network controller 220. In embodiments, the power-saving controller 215 can identify an appropriate time to enter a power saving mode and notify the power-saving module 210. The power-saving module can then identify an appropriate time to send a signal to the network controller 220, and can then send a signal to the network controller 220 requesting admission into a power-saving mode. For example, the power-saving controller 215 can direct the power-saving module 210 to generate a power state request information element and insert the power state request information elements into a reservation request message, and the reservation request message can be sent to a network controller 220. Upon successful entry into the power saving mode, the power-saving module 210 can notify the power saving controller which in turn can retain power state information.

In embodiments, a power-saving controller 215 can direct the power-saving module to exit from a power-saving mode. For example, the power-saving controller 215 can indicate to the power-saving module to send a message requesting exit from a power-saving mode to the network controller 220. In embodiments, the power-saving module 210 can then identify an appropriate time to send a signal to the network controller 220, and can send a signal to the network controller 220 requesting exit from a power-saving mode. For example, the power-saving controller 215 can direct the power-saving module to generate an admission request (e.g., one or more bits signaling a MoCA node's request to return to an active state) and insert the admission request into a heartbeat message (e.g., a message output from a MoCA node in a power-saving mode to a network controller 220 at specific intervals). The heartbeat message containing the admission request can be sent to a network controller 220.

Figure 3:
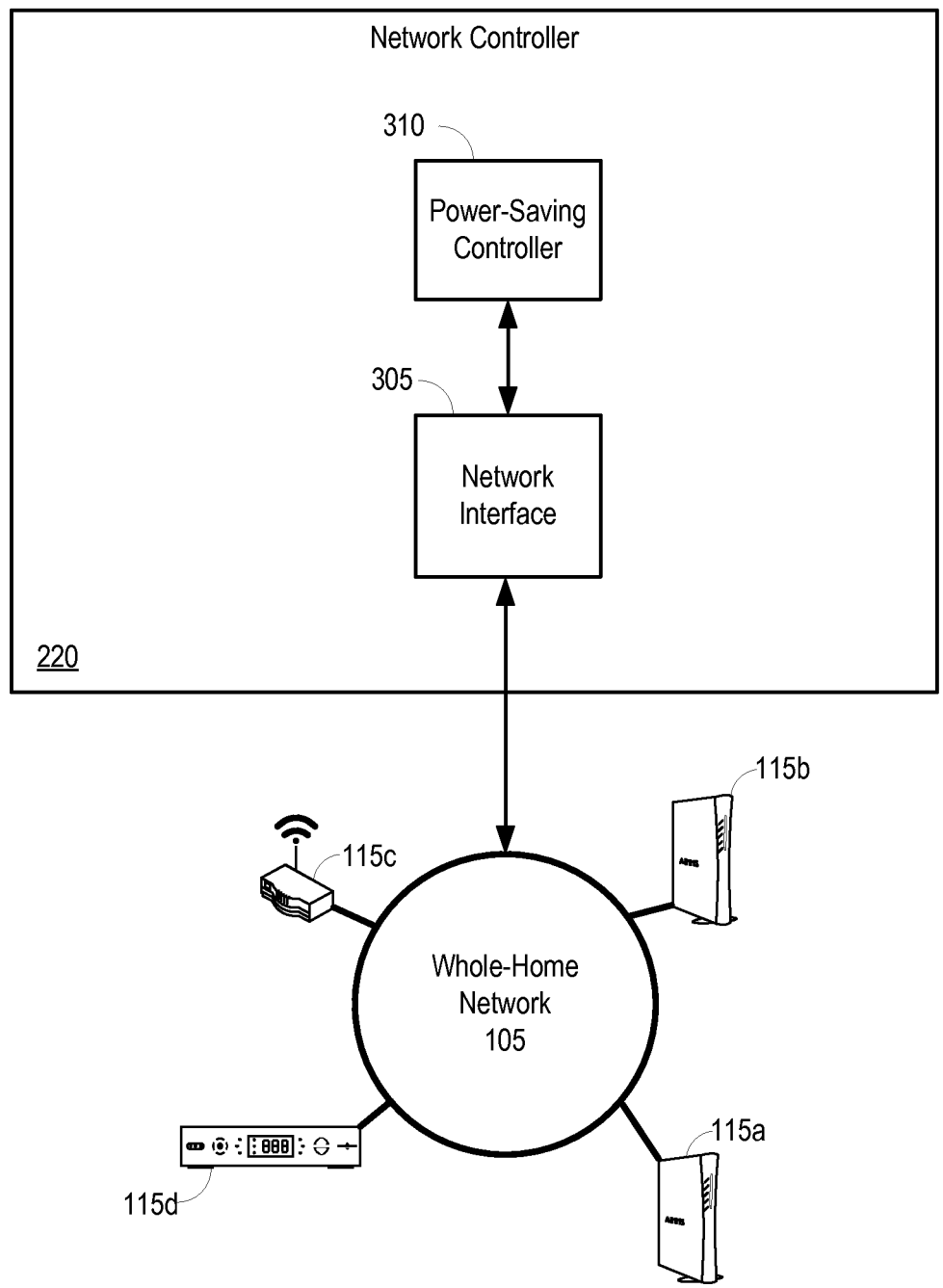
FIG. 3 is a block diagram illustrating an example network controller operable to facilitate a node's transition to and from a power-saving mode.

FIG. 3 is a block diagram illustrating an example network controller 220 operable to facilitate a node's transition to and from a power-saving mode. The network controller 220 can be connected to the same whole-home network 105 as one or more nodes (e.g., nodes 115a-d). In embodiments, a network controller 220 can include a network interface 305 and a power-saving controller 310. The network interface 305 can be used to receive data from and output data to a whole-home network 105.

In embodiments, a power-saving controller 310 can detect a condition signaling the transition of a node 115*a-d* to or from a power-saving mode. For example, a power-saving controller 310 can detect a MoCA node's request to enter or exit a power-saving mode in a message received from that MoCA node (e.g., reservation request message, heartbeat message, etc.). In embodiments, the condition signaling the transition of a node 115*a-d* to or from a power-saving mode can be local to the network controller 220. For example, a subscriber can interface with the network controller 220 to signal a desired transition of a node to or from a power-saving mode, or internal configurations of the network controller 220 can signal a desired transition of a node to or from a power-saving mode upon the occurrence of a predetermined condition.

In embodiments, a power-saving controller 310 can generate a message directing a node 115*a-d* to enter a power-saving mode. For example, the power-saving controller 215 can send the message directing the node 115*a-d* to enter a power-saving mode when the node 115*a-d* is in an active state (e.g., the node 115*a-d* is receiving transmissions from the network controller 220).

In embodiments, a power-saving controller 310 can receive and identify a power state request information element in a reservation request message received from a node 115*a-d*. In response to the power state request information elements, the power-saving controller 310 can generate and output a power state grant (e.g., a message approving the node's request to enter a power-saving mode) to the node 115*a-d*.

In embodiments, a power-saving controller 310 can receive and identify an admission request in a heartbeat message received from a node 115*a-d*. In response to the admission request, the power-saving controller 310 can generate and output a wake message (e.g., a message directing a node 115*a-d* to exit a power-saving mode) to the node 115*a-d*. For example, the power-saving controller 310 can insert the wake message into a heartbeat acknowledgement message.

Figure 4:
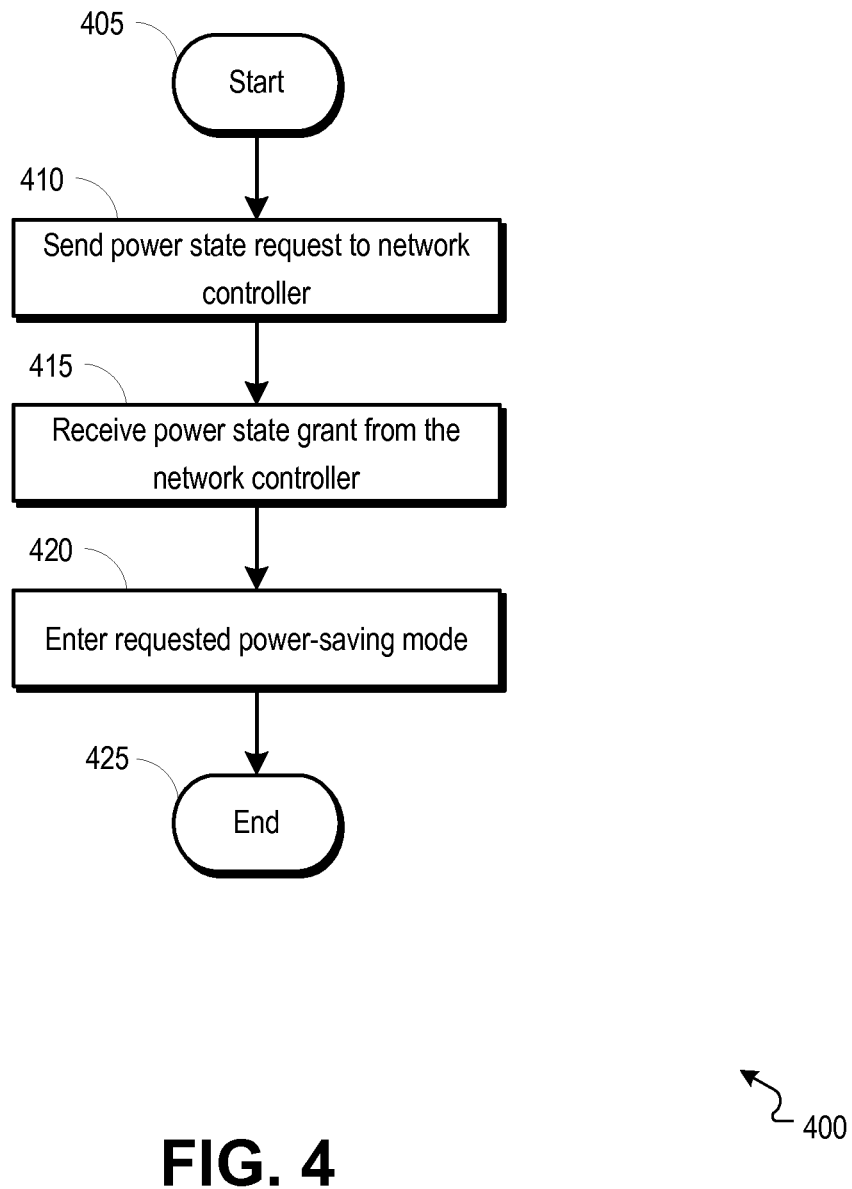
FIG. 4 is a flowchart illustrating an example process operable to facilitate a node's transition to a power-saving mode.

FIG. 4 is a flowchart illustrating an example process 400 operable to facilitate a node's transition to a power-saving mode. The process 400 can start at 405 when a node is in an active state (e.g., M0 state), and a condition occurs to signal or initiate the node's transition to a power-saving mode. In embodiments, a node's transition to a power-saving mode can be signaled or initiated by the occurrence of a condition that is local or remote to the node. For example, conditions signaling a node's transition to a power-saving mode can include a condition occurring at the node such (e.g., the pressing of a power, resume, or sleep button on the node, the node remaining idle for a predetermined period of time, an internal configuration of the node, etc.) or a condition occurring outside of the node (e.g., a signal received from and generated by a network controller 220 of FIG. 2).

At 410, a power state request can be sent to a network controller. In embodiments, a power state request (e.g., a message requesting entry of a node into a power-saving mode) can be sent from a node 115 to a network controller 220 via a whole-home network 105. For example, the power state request can be initiated by a power-saving controller 215 of a node 115 and can be recognized by a power-saving controller 310 of a network controller 220. In embodiments, the power state request can be a power state request information element that is inserted into a reservation request message.

At 415, a power state grant can be received from a network controller. In embodiments, a power state grant (e.g., a message approving a node's request to enter a power-saving mode) can be sent from a network controller 220 to a node 115 via a whole-home network 105 in response to a power state request received from the node 115. For example, the power state grant can be generated by a power-saving controller 310 of a network controller 220 and can be recognized by a power-saving controller 215 of the node 115 requesting entry into a power-saving mode.

At 420, the node can enter a requested power-saving mode. For example, a MoCA node can enter the power-saving mode that is identified in the power state request sent to the network controller 220 at 410. In embodiments, a power-saving module 210 of the node 115 can place the node 115 into the requested power-saving mode. For example, a version one MoCA node can be placed into a M3 power-saving mode. After the node 115 enters the requested power-saving mode, the process 400 can end at 425.

Figure 5:
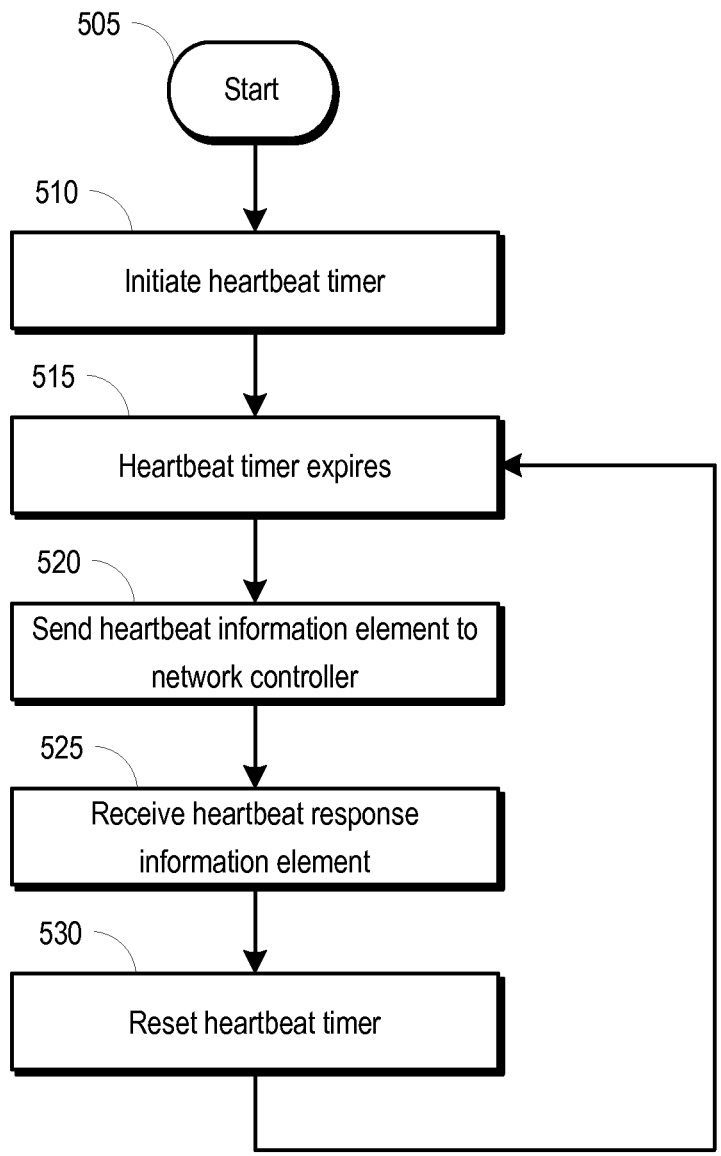
FIG. 5 is a flowchart illustrating an example process operable to facilitate communication of heartbeat information between a node and a network controller.

FIG. 5 is a flowchart illustrating an example process 500 operable to facilitate communication of heartbeat information between a node and a network controller. The process 500 can start at 505 when a node 115 is in a power-saving mode (e.g., a MoCA M1, M2, or M3 state). For example, when a MoCA node is in the M3 state, a receiver associated with the MoCA node is temporarily and/or periodically disabled.

At 510, a heartbeat timer can be initiated. In embodiments, a heartbeat timer can be initiated, for example, by a power-saving controller 215 of a node 115. The heartbeat timer can be set to a variety of different amounts of time, and the amount of time can be based, at least in part, upon the frequency at which the node 115 is required to identify itself to a network controller 220. In embodiments, the heartbeat timer can be set to correspond with a heartbeat transmission opportunity (e.g., a time identified by a network controller 220 for the node to transmit a heartbeat message to the network controller 220). In embodiments, a heartbeat transmission opportunity can be identified by a node 115 (e.g., a power-saving controller 215 of a node 1115) from a MAP message that is received by the node 115 from a network controller 220. For example, the node 115 can identify a heartbeat transmission opportunity from an admission control frame (ACF) slot within a MAP message. The heartbeat timer can expire at 515.

At 520, a heartbeat information element can be sent to the network controller 220. The heartbeat information element can be generated and output to the network controller 220, for example, by a power-saving controller 215 of a node 115. When a node is in a power-saving mode, a heartbeat information element can allow a network controller 220 to identify the node as a node that is still connected to an associated whole-home network. For example, upon receiving a heartbeat message from a MoCA node, a network controller can identify the MoCA node as a node that is still connected to an associated MoCA network. In embodiments, when a heartbeat information element is sent from a node, the node can enable a receiver associated with the node.

At 525, a heartbeat acknowledgement information element can be received from the network controller 220. In response to receiving a heartbeat information element, a network controller (e.g., a power-saving controller 310 of a network controller 220) can generate and output a heartbeat acknowledgement information element (e.g., a message informing an associated MoCA node that the network controller recognizes the MoCA node as being connected to an associated MoCA network) to the node from which the heartbeat information element was received. In embodiments, when a node receives a heartbeat acknowledgement information element, a receiver associated with the node can be disabled.

At 530, the heartbeat timer can be reset. In embodiments, the heartbeat timer can be reset when a heartbeat acknowledgment information element is received by a node 115 from a network controller 220. After the heartbeat timer is reset, the process 400 can return to 515 where the heartbeat timer expires.

Figure 6:
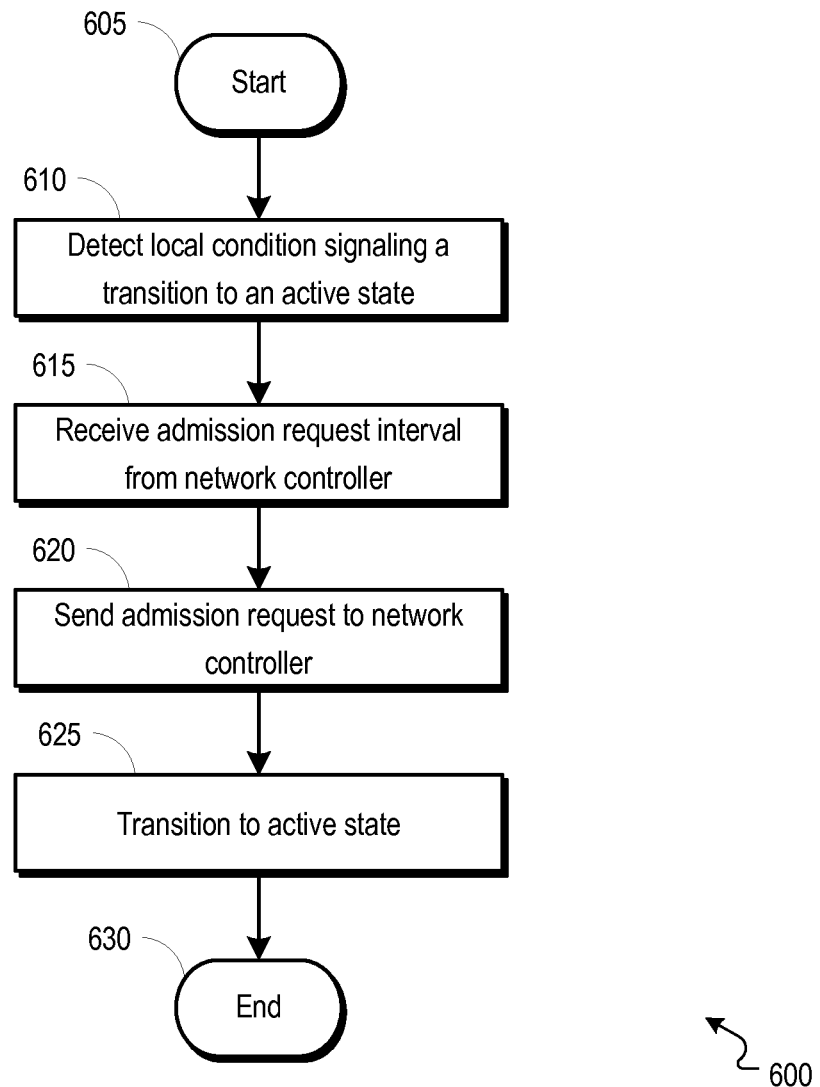
FIG. 6 is a flowchart illustrating an example process operable to facilitate a node's transition from a power-saving mode to an active state upon the detection of a local condition.

FIG. 6 is a flowchart illustrating an example process 600 operable to facilitate a node's transition from a power-saving mode to an active state upon the detection of a local condition. The process 600 can start at 605 when a node is in a power-saving mode (e.g., MoCA M1, M2, or M3 state), and a condition occurs to signal or initiate the node's transition to an active state (e.g., MoCA M0 state).

At 610, a node can detect the occurrence of a local condition signaling or initiating a transition from a power-saving mode to an active state. The occurrence of a local condition can be detected, for example, by a power-saving controller 215 of a node 115. In embodiments, a local condition can be a condition occurring at the node 115 such as the pressing of a power, resume, or sleep button on the node, the node remaining idle for a predetermined period of time, an internal configuration of the node, as well as others.

At 615, an admission request interval can be received by the node from a network controller. An admission request interval can be recognized by a power-saving controller 215 of a node 115. In embodiments, the admission request interval can assign the node 115 a specific time at which the node can output requests to transition to an active state to a network controller 220.

At 620, the node can send an admission request to the network controller. An admission request can be generated and output, for example, by a power-saving controller 215 of a node 115. In embodiments, the admission request can be sent to a network controller 220 at a time interval that is appropriate according to the admission request interval associated with the node 115.

At 625, the node can transition to an active state. In embodiments, a power-saving module 210 of a node 115 can transition the node to an active state (e.g., M0 state). After the node transitions to an active state, the process 600 can end at 630.

Figure 7:
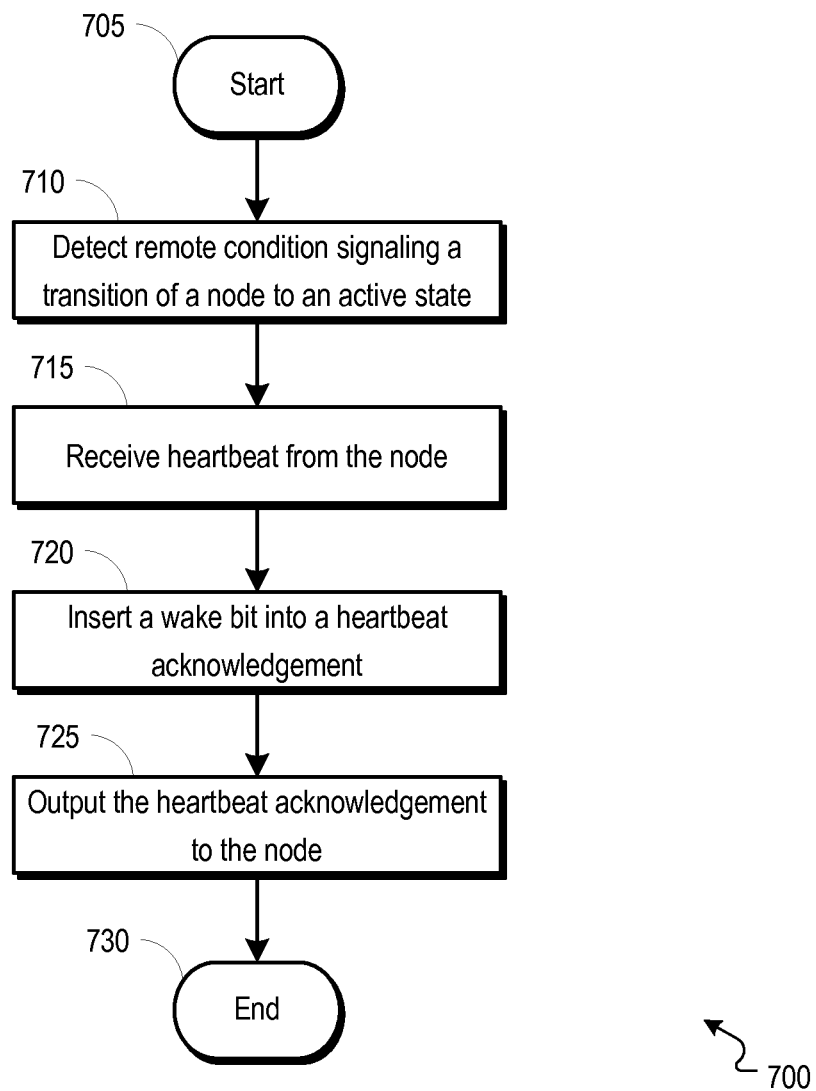
FIG. 7 is a flowchart illustrating an example process operable to facilitate a node's transition from a power-saving mode to an active state upon the detection of a remote condition.

FIG. 7 is a flowchart illustrating an example process 700 operable to facilitate a node's transition from a power-saving mode to an active state upon the detection of a remote condition. The process 700 can start at 705 when a node is in a power-saving mode (e.g., M1, M2, or M3 state), and a condition occurs to signal or initiate the node's transition to an active state.

At 710, a network controller can detect the occurrence of a condition requiring, signaling or initiating a transition of a node from a power-saving mode to an active state. The occurrence of a condition can be detected, for example, by a power-saving controller 310 of a network controller 220. In embodiments, a condition requiring the transition of a node from a power-saving mode to an active state can be determined through a subscriber's interface with the network controller 220, the node having remained idle for a predetermined period of time, an internal configuration of the network controller 220, as well as others.

At 715, a heartbeat message can be received by the network controller from a node. A heartbeat message can be recognized by a power-saving controller 310 of a network controller 220. In embodiments, the heartbeat message can inform the network controller 220 that the receiver of the node from which the heartbeat message was received will be active until a heartbeat acknowledgement information element is received by the node.

At 720, a wake bit or code can be inserted into a heartbeat acknowledgement information element. A wake bit or code can be inserted into a heartbeat acknowledgement information element, for example, by a power-saving controller 310 of a network controller 220. In embodiments, the wake bit or code can be recognizable by a node 115, and the wake bit or code can direct the node 115 to transition from a power-saving mode to an active state.

At 725, the heartbeat acknowledgement information element including the wake bit or code can be output to a node. After the heartbeat acknowledgement information element is output to a node, the process 700 can end at 730.

Figure 8:
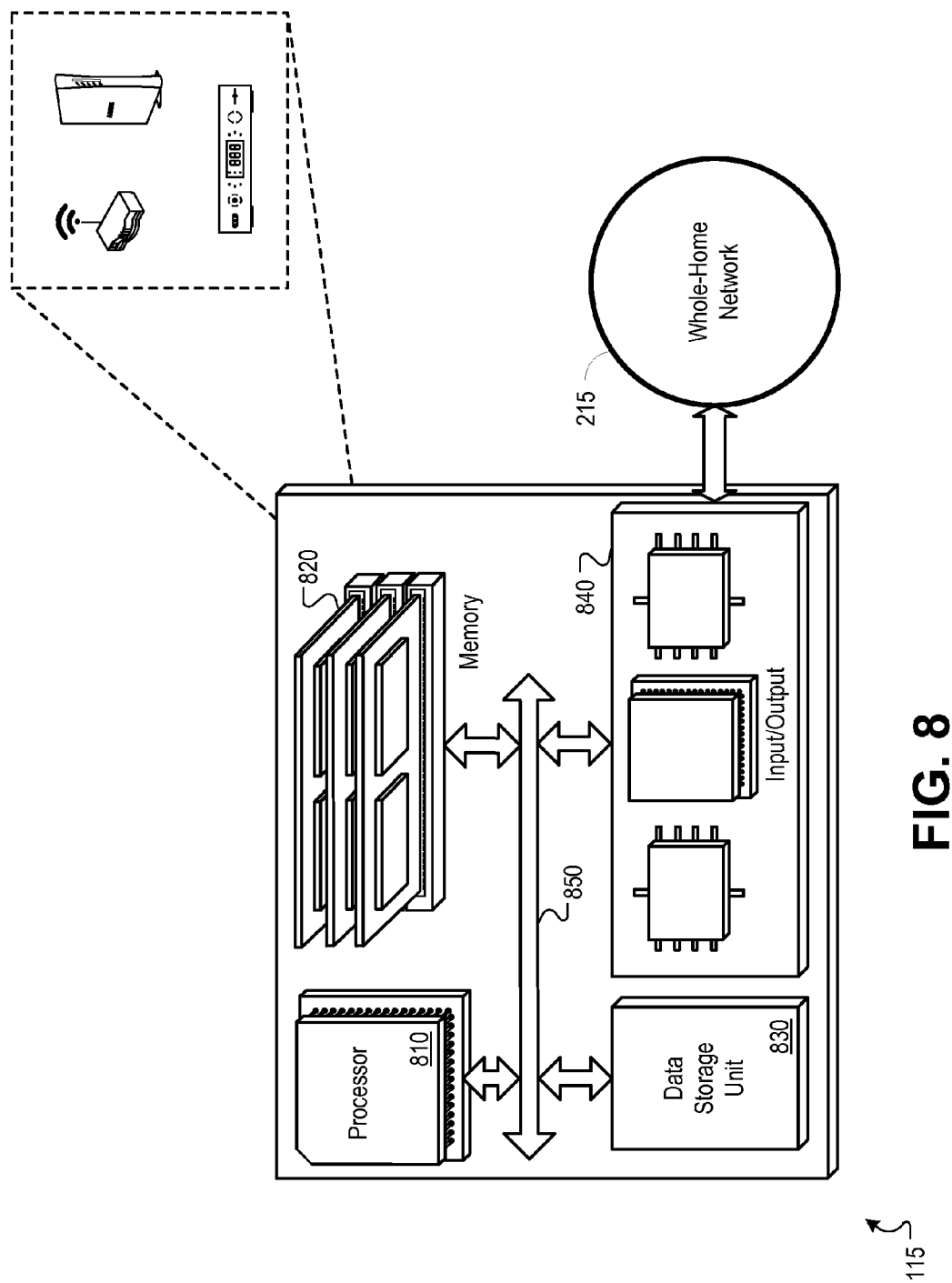
FIG. 8 is a component diagram of an example node operable to facilitate a transition to and from a power-saving mode.

FIG. 8 is a component diagram of an example node 115 operable to facilitate a transition to and from a power-saving mode. While a modem, a wireless node, and a set-top box is shown, it should be understood that a variety of other types of nodes (e.g., MoCA nodes) can include components that are operable to facilitate the node's transition to and from a power-saving mode. The device 115 can include a processor 810, a memory 820, a storage device 830, and an input/output device 840. Each of the components 810, 820, 830, and 840 can, for example, be interconnected using a system bus 850. The processor 810 can be capable of processing instructions for execution within the node 115. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration of the node 115. In one implementation, the memory 820 can be a computer-readable medium. In one implementation, the memory 820 can be a volatile memory unit. In another implementation, the memory 820 can be a non-volatile memory unit.

In embodiments, the storage device 830 can be capable of providing mass storage for the node 115. In one implementation, the storage device 830 can be a computer-readable medium. In various different implementations, the storage device 830 can, for example, include a hard disk device, an optical disk device, flash memory or some other large capacity storage device. In embodiments, the storage device 830 can be a DVR or PVR.

The input/output device 840 can provide input/output operations for the node 115. In embodiments, the input/output device 840 can include driver devices configured to receive data from or output data onto a whole-home network 105. In embodiments, the input/output device 840 can include driver devices configured to receive input data and send output data to other input/output devices, such as one or more other nodes 115 connected to a whole-home network 105. In embodiments, the input/output device 840 can include driver devices configured to receive data from or output data onto other networked connections as well.

Those skilled in the art will appreciate that the invention improves upon options for saving energy through the implementation of power-saving modes on network devices. Moreover, the invention improves upon the transitioning of a network device from an active state to a power-saving mode, and vice versa.

The methods, systems, and apparatuses described in this disclosure enable the transitioning of a MoCA version 1 node to a power-saving mode via communications with a MoCA version 2 network controller. Moreover, the subject matter of this disclosure enables the transitioning of a MoCA version 1 node to an active state upon the detection of a local or a remote condition.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. In embodiments, a remote control (e.g., a device using infrared or radio frequency signals) can be used to provide for interaction with a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

What is claimed is:

1. A method comprising:
generating a request for entry into a power-saving state at a first node of a MoCA network, wherein the first node has a first power-saving protocol supporting a plurality of power-saving states consisting of an M0 power state and an M3 power state;
outputting the request for entry into the power-saving state to a network controller of the MoCA network, wherein the network controller comprises a second node having a second power-saving protocol, the second power-saving protocol being different from the first power-saving protocol, the second power-saving protocol supporting a second plurality of power-saving states comprising the M0 power state, an M1 power state, an M2 power state, and the M3 power state;
receiving a message approving the first node's entry into the power-saving state, the message being received from the network controller; and
transitioning from a current state to the power-saving state.

2. The method of claim 1, further comprising:
while the first node is in the power-saving state, initiating a heartbeat timer at the first node;
exiting the power-saving state and outputting a heartbeat information element to the network controller upon the expiration of the heartbeat timer;
receiving a heartbeat response at the first node from the network controller; and
upon receiving the heartbeat response, returning to the power-saving state.

3. The method of claim 1, further comprising:
detecting a condition signaling a transition from the power-saving state to an active state;
identifying an admission request interval at the first node;
generating an active state admission request;
outputting the active state admission request to the network controller at the identified admission request interval; and
transitioning from the power-saving state to the active state.

4. The method of claim 3, wherein the active state comprises a state, wherein a transmitter associated with the first node is active, a receiver associated with the first node is active, and the first node possesses full visibility to other devices connected to an associated network.

5. The method of claim 3, wherein the condition signaling a transition from the power-saving state to an active state comprises the pressing of a power, resume, or sleep button on the first node, the first node remaining idle for a predetermined period of time, or an internal configuration of the first node.

6. The method of claim 1, further comprising:
detecting a condition signaling a transition from the power-saving state to an active state;
receiving a heartbeat information element from the first node, the heartbeat information element being received at the network controller;
receiving a heartbeat acknowledgement at the first node containing a wake indication; and
transitioning from the power-saving state to the active state.

7. The method of claim 1, wherein, while in the power-saving state, a transmitter associated with the first node only outputs periodic heartbeats, a receiver associated with the first node wakes to listen to specific messages, and the first node has no visibility to other devices connected to an associated network.

8. A first node configured to be communicatively coupled to a MoCA network, wherein the first node has a first power-saving protocol supporting a plurality of power-saving states consisting of an M0 power state and an M3 power state, the first node comprising:
a controller module configured to generate a request for entry into a power-saving state;
an interface for communicatively coupling the first node to a MoCA network, the interface configured to:
output the request for entry into the power-saving state to a network controller, wherein the network controller comprises a second node of the MoCA network having a second power-saving protocol, the second power-saving protocol being different from the first power-saving protocol, the second power-saving protocol supporting a second plurality of power-saving states comprising the M0 power state, an M1 power state, an M2 power state, and the M3 power state; and
receive a message approving the node's entry into the power-saving state, the message being received from the network controller; and
a power-saving module configured to transition the node from a current state to the power-saving state.

9. The first node of claim 8, wherein:
the controller module is further configured to initiate a heartbeat timer while the first node is in the power-saving state, and upon receiving a heartbeat response, to disable a receiver associated with the first node; and
the interface is further configured to:
output a heartbeat information element to the network controller upon the expiration of the heartbeat timer; and
receive the heartbeat response from the network controller.

10. The first node of claim 9, wherein the heartbeat response includes a wake indication, and the power-saving module is further configured to transition the node from the power-saving state to an active state upon detection of the wake indication.

11. The first node of claim 8, wherein:
the controller module is further configured to:
detect a condition signaling a transition from the power-saving state to an active state;
the interface is further configured to output the active state admission request to the network controller at the identified admission request interval; and
the power-saving module is further configured to:
identify an admission request interval;
generate an active state admission request; and
transition the node from the power-saving state to the active state.

12. The first node of claim 11, wherein the active state comprises a state, wherein a transmitter associated with the first node is active, a receiver associated with the first node is active, and the first node possesses full visibility to other devices connected to an associated network.

13. The first node of claim 11, wherein the condition signaling a transition from the power-saving state to an active state comprises the pressing of a power, resume, or sleep button on the node, the node remaining idle for a predetermined period of time, or an internal configuration of the node.

14. The first node of claim 8, wherein, while the first node is in the power-saving state, a transmitter associated with the first node only outputs periodic heartbeats, a receiver associated with the first node wakes to listen to specific messages, and the first node has no visibility to other devices connected to an associated network.

15. One or more non-transitory computer readable media having instructions operable to cause one or more processors to perform operations comprising:
 generating a request for entry into a power-saving state at a first node of a MoCA network, wherein the first node has a first power-saving protocol supporting a plurality of power-saving states consisting of an M0 power state and an M3 power state;
 outputting the request for entry into the power-saving state to a network controller of the MoCA network, wherein the network controller comprises a second node having a second power-saving protocol, the second power-saving protocol being different from the first power-saving protocol, the second power-saving protocol supporting a second plurality of power-saving states comprising the M0 power state, an M1 power state, an M2 power state, and the M3 power state;
 receiving a message approving the first node's entry into the power-saving state, the message being received from the network controller; and
 transitioning from a current state to the power-saving state.

16. The one or more non-transitory computer-readable media of claim 15, having instructions further operable to cause the one or more processors to perform the operations comprising:
 while the first node is in the power-saving state, initiating a heartbeat timer at the first node;
 outputting a heartbeat information element to the network controller upon the expiration of the heartbeat timer;
 receiving a heartbeat response at the first node, the heartbeat response being received from the network controller; and
 upon receiving the heartbeat response, disabling a receiver associated with the first node.

17. The one or more non-transitory computer-readable media of claim 15, having instructions further operable to cause the one or more processors to perform the operations comprising:
 detecting a condition signaling a transition from the power-saving state to an active state;
 identifying an admission request interval at the first node;
 generating an active state admission request;
 outputting the active state admission request to the network controller at the identified admission request interval; and
 transitioning from the power-saving state to the active state.

18. The one or more non-transitory computer-readable media of claim 17, wherein the condition signaling a transition from the power-saving state to an active state comprises the pressing of a power, resume, or sleep button on the first node, the first node remaining idle for a predetermined period of time, or an internal configuration of the first node.

19. The one or more non-transitory computer-readable media of claim 15, having instructions further operable to cause the one or more processors to perform the operations comprising:
 detecting a condition requesting a transition for the first node from the power-saving state to an active state;
 receiving a heartbeat information element from the first node, the heartbeat information element being received at the network controller;
 receiving a heartbeat acknowledgement containing a wake bit; and
 transitioning the first node from the power-saving state to the active state.

20. A method comprising:
 generating a request for entry into a power-saving state at a first node of a MoCA network, wherein the first node has a first power-saving protocol supporting a plurality of power-saving states consisting of an M0 power state and an M3 power state;
 outputting the request for entry into the power-saving state to a network controller of the MoCA network, wherein the network controller comprises a second node having a second power-saving protocol, the second power-saving protocol being different from the first power-saving protocol, the second power-saving protocol supporting a second plurality of power-saving states comprising the M0 power state, an M1 power state, an M2 power state, and the M3 power state;
 receiving a message approving the first node's entry into the power-saving state, the message being received from the network controller;
 transitioning to the power-saving state;
 outputting a heartbeat information element to the network controller;
 receiving a heartbeat acknowledgement containing a wake indication; and
 transitioning from the power-saving state to an active state.

* * * * *